(12) United States Patent
Hseush et al.

(10) Patent No.: US 11,514,373 B2
(45) Date of Patent: Nov. 29, 2022

(54) BIONIC COMPUTING SYSTEM AND CLOUD SYSTEM THEREOF

(71) Applicants: BigObject, Inc., Taiwan (TW); CERTIS CISCO SECURITY PTE LTD., Singapore (SG)

(72) Inventors: Wenwey Hseush, Taiwan (TW); Shyy San Foo, Singapore (SG)

(73) Assignees: BigObject, Inc., Taiwan (TW); CERTIS CISCO SECURITY PTE LTD., Singapore (SG)

( * ) Notice: Subject to any disclaimer, the term of this patent is extended or adjusted under 35 U.S.C. 154(b) by 249 days.

(21) Appl. No.: 16/912,905

(22) Filed: Jun. 26, 2020

(65) Prior Publication Data

US 2020/0410402 A1 Dec. 31, 2020

Related U.S. Application Data

(60) Provisional application No. 62/867,246, filed on Jun. 27, 2019.

(51) Int. Cl.
*G06N 20/20* (2019.01)
*G06N 5/04* (2006.01)

(52) U.S. Cl.
CPC .............. *G06N 20/20* (2019.01); *G06N 5/043* (2013.01)

(58) Field of Classification Search
CPC ........ G06N 3/08; G06N 20/20; G06N 3/0445; G06N 5/043
See application file for complete search history.

(56) References Cited

U.S. PATENT DOCUMENTS

| 10,175,697 | B1* | 1/2019 | Sachdeva | ............. G06T 19/003 |
| 2008/0091628 | A1* | 4/2008 | Srinivasa | ................ G06N 3/08 |
| | | | | 706/12 |

(Continued)

FOREIGN PATENT DOCUMENTS

| CN | 104303218 A | 1/2015 |
| CN | 10428522 A | 11/2019 |

(Continued)

OTHER PUBLICATIONS

"Augmented Visual Intelligence"—Joo-Hwee Lim, TENCON 2015—2015 IEEE Region 10 Conference; DOI: 10.1109/TENCON.2015.7373017; Date of Conference: Nov. 1-4, 2015 (Year: 2015).*

(Continued)

*Primary Examiner* — Mainul Hasan
(74) *Attorney, Agent, or Firm* — Sterne, Kessler, Goldstein & Fox P.L.L.C.

(57) ABSTRACT

The bionic computing system includes a perception subsystem, an attention subsystem, and a temporal-spatial awareness subsystem. The perception subsystem has several perceptual devices for detecting objects from sequences of sensory data and generating an object record for each object. The attention subsystem adjusts the object records by re-identifying the tracking identities across sensory devices, generates several object associations, generate several location associations, and generates several motion implications. The temporal-spatial awareness subsystem organizes and retains the object records in a working memory space. The perception subsystem identifies several basic events from each sensory datum of the same perceptual device, the attention subsystem identifies an episodic event by determining that a portion of the basic events from the same sensory device within a temporal window conform to a pattern, and the temporal-spatial awareness subsystem iden- (Continued)

tifies a complex event according the detected episodic event and the object records in the working memory space.

15 Claims, 4 Drawing Sheets

(56) References Cited

U.S. PATENT DOCUMENTS

| | | | | |
|---|---|---|---|---|
| 2013/0262349 | A1* | 10/2013 | Bouqata | G06N 20/10 |
| | | | | 706/12 |
| 2018/0314253 | A1* | 11/2018 | Mercep | G01S 15/66 |
| 2018/0349785 | A1* | 12/2018 | Zheng | G05D 1/0088 |
| 2019/0087975 | A1* | 3/2019 | Versace | G06N 3/008 |
| 2020/0302161 | A1* | 9/2020 | Sriram | G06V 10/7625 |
| 2021/0034959 | A1* | 2/2021 | Wood | G06K 9/6228 |

FOREIGN PATENT DOCUMENTS

| | | |
|---|---|---|
| TW | I310919 | 6/2009 |
| TW | I459332 B | 11/2014 |
| TW | I462035 B | 11/2014 |
| TW | M544738 U | 7/2017 |

OTHER PUBLICATIONS

Notification Letter of Review Opinion from Intellectual Property Bureau of the Ministry of Economic Affairs *11020228070* (Search Report).

* cited by examiner

BIONIC COMPUTING SYSTEM AND CLOUD SYSTEM THEREOF

PRIORITY

This application claims priority to U.S. Provisional Patent Application No. 62/867,246 filed on Jun. 27, 2019, which is hereby incorporated by reference in its entirety.

BACKGROUND OF THE INVENTION

Field of the Invention

The present invention relates to a bionic computing system and a cloud system thereof. More specifically, the present invention relates to a human-memory-like bionic computing system and a cloud system thereof that organize and retain information in short-term and long-term memory spaces, identify complex events happening in real time in real world, and provide predictions and human-like analyses.

Descriptions of the Related Art

In light of recent developments in technology like deep neural network, web tracking, Internet of Things (IoT), edge computing, etc., the means of acquiring data has been significantly changed. This makes today's data appear quite differently in volume, velocity, variety, and veracity. It is massive, streaming, multi-faceted, and from a large variety of sources. With these characteristics, the attention of industry has been shifted from production data, traditionally managed and used by professionals to conduct business processes, to behavioral data, which simply reflects the facts in the objective world, or precisely the physical world governed by laws of nature.

The aforementioned phenomenon leads to a paradigm shift for data application and hence the way of handling technical problems in various industries. Taking the security and enforcement industry as an example, situational awareness is critical to our daily operations. The perception of environmental elements and events with respect to time or space, the comprehension of their meaning, and the projection of the future state enable us to make informed decision across a broad range of situations, ranging from integrated security services for commercial buildings, aviation security, to critical infrastructure protection.

Although behavioral data is found everywhere and anytime, it is often incomplete, inaccurate, or even misleading. This is because today's world is not only complex but also changing rapidly, and concepts may be drifting from time to time. Therefore, in order to respond to rapidly changing situations or suddenly arisen events, be aware of usual situations, and even learn to develop new concept, there is an urgent need for a human-like memory system that can capture and process multi-sourced behavioral data in a timely manner.

SUMMARY OF THE INVENTION

Provided is a bionic computing system. The bionic computing system in certain embodiments may comprise a perception subsystem, an attention subsystem, and a temporal-spatial awareness subsystem.

The perception subsystem comprises a plurality of perceptual devices, wherein each of the perceptual devices corresponds to at least one sensory device. Each of the perceptual devices receives a sequence of sensory data from each corresponding sensory device, detects a plurality of objects from each corresponding sequence of sensory data in an AI-based manner, and generates an object record for each of the objects, wherein each of the object records comprises a tracking identity that is locally unique, a timestamp, and a location.

The attention subsystem is configured to adjust the object records by re-identifying the tracking identities across the sensory devices. The attention subsystem is further configured to generate a plurality of object associations, a plurality of location associations, and a plurality of motion implications. Each of the object associations is between two objects detected from the same sensory datum. Each of the location associations is between one of the objects and predefined interested location. Each of the motion implications pertains to one of the objects with the same tracking identity and two of the sensory data from the same sensory device.

The temporal-spatial awareness subsystem is configured to organize and retain the object records in a working memory space according to the timestamps and the locations.

The perception subsystem is further configured to identify a plurality of basic events from each sensory datum of the same perceptual device, the attention subsystem is further configured to identify an episodic event by determining that a portion of the basic events from the same sensory device within a temporal window conform to a predetermined pattern, and the temporal-spatial awareness subsystem is further configured to identify a complex event according the detected episodic event and an entire history of object records retained in the working memory space.

The bionic computing system in certain embodiments may further comprise a prediction subsystem. The prediction subsystem is configured to train an anticipation model according to the object records, the object associations, location associations, and the motion implications. The prediction subsystem is further configured to provide a finite sequence of predicted object records for a concerned object.

The bionic computing system in certain embodiments may further comprise an analytic subsystem. The temporal-spatial awareness subsystem may be further configured to remove the object records that exist in the working memory space longer than a predetermined time length from the working memory space to a long-term memory space. The analytic subsystem is configured to assist a human or an expert system to analyze and plan an application in a timely and interactive manner with reference to all the object records in the long-term memory space.

Provided is a cloud system. The cloud system in certain embodiments may comprise the aforesaid attention subsystem and the temporal-spatial awareness subsystem. The cloud system in certain embodiments may comprise the aforesaid prediction subsystem and/or the analytic subsystem.

The bionic computing system brings to life an artificial mind of awareness, which mirrors people, objects, and things everywhere and anytime in the objective world. By means of perception (which is similar to artificial perception), it acquires, organizes, and retains timely data, aiming to reconstruct the real-world dynamics to identify meaningful events, detect unusual situations, track thousands of moving objects, reason out interesting concepts, and/or anticipate something about to happen for the purpose of maintaining security and social order.

Moreover, the bionic computing system is built to adapt to changing environments. By use of machine learning algorithms, it is capable of learning to develop new models from experiences, which are recollected in the long-term memory of the artificial mind. Once a model starts drifting away from the actual situations, the bionic computing system will rebuild the artificial mind by retraining the new model with the recently perceived data to anticipate the new behaviors in the changing environment.

The detailed technology and preferred embodiments implemented for the subject invention are described in the following paragraphs accompanying the appended drawings for a person having ordinary skill in the art to well appreciate the features of the claimed invention.

DESCRIPTION OF THE PREFERRED EMBODIMENT

In the following descriptions, the bionic computing system and the cloud system thereof will be explained with reference to certain exemplary embodiments thereof. However, these exemplary embodiments are not intended to limit the present invention to any specific environment, example, embodiment, applications, or implementations described in these exemplary embodiments. Therefore, descriptions of these exemplary embodiments are only for purpose of illustration rather than to limit the scope of the present invention. It should be appreciated that, in the following exemplary embodiments and the attached drawings, elements unrelated to the present invention are omitted from depiction. In addition, dimensions of and dimensional scales between individual elements in the attached drawings are provided only for ease of depiction and illustration but not to limit the scope of the present invention.

Figure 1:
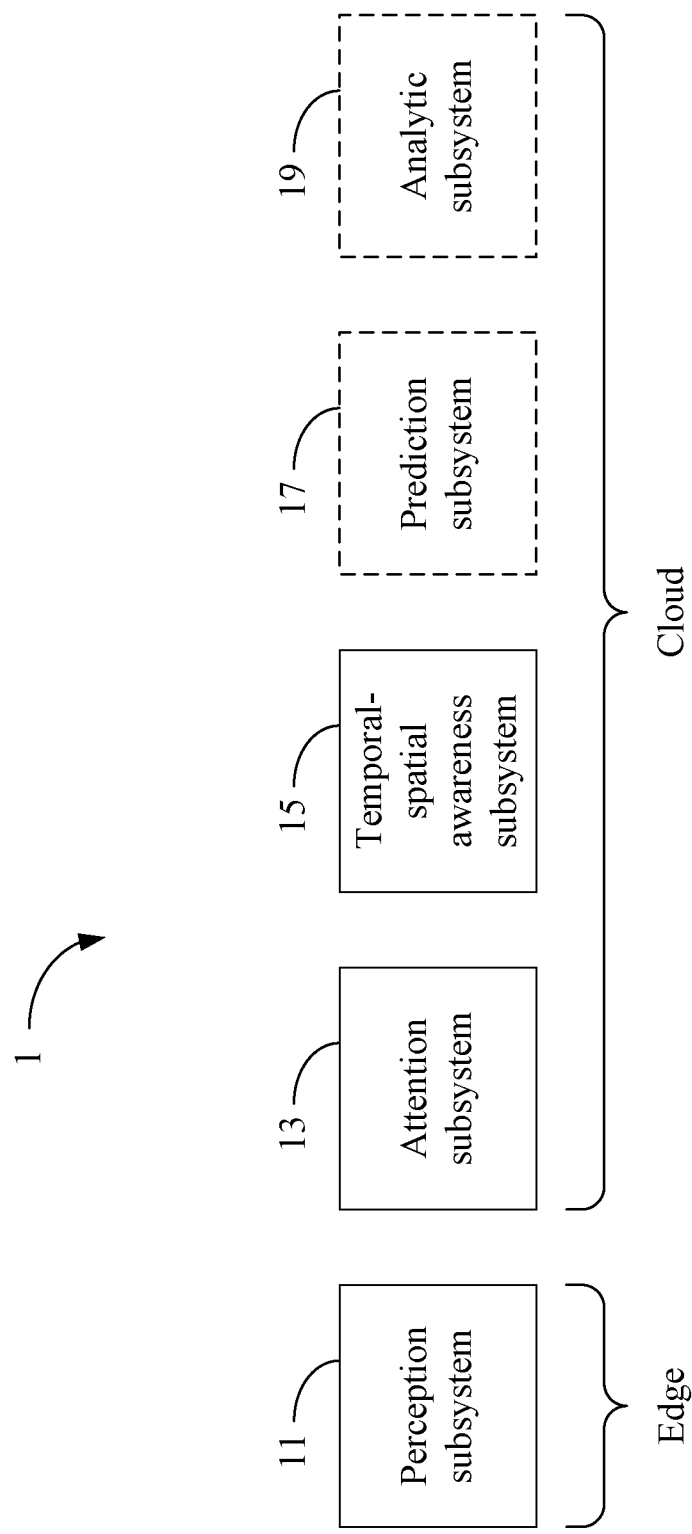
FIG. 1 illustrates a schematic view of the bionic computing system 1 of an embodiment of the present invention.

An embodiment of the present invention is a bionic computing system 1, and a schematic view of which is illustrated in FIG. 1. The bionic computing system 1 comprises a perception subsystem 11, an attention subsystem 13, and a temporal-spatial awareness subsystem 15, a prediction subsystem 17, and an analytic subsystem 19. Please note that the prediction subsystem 17 and the analytic subsystem 19 are optional in some other embodiments of the present invention.

Figure 2:
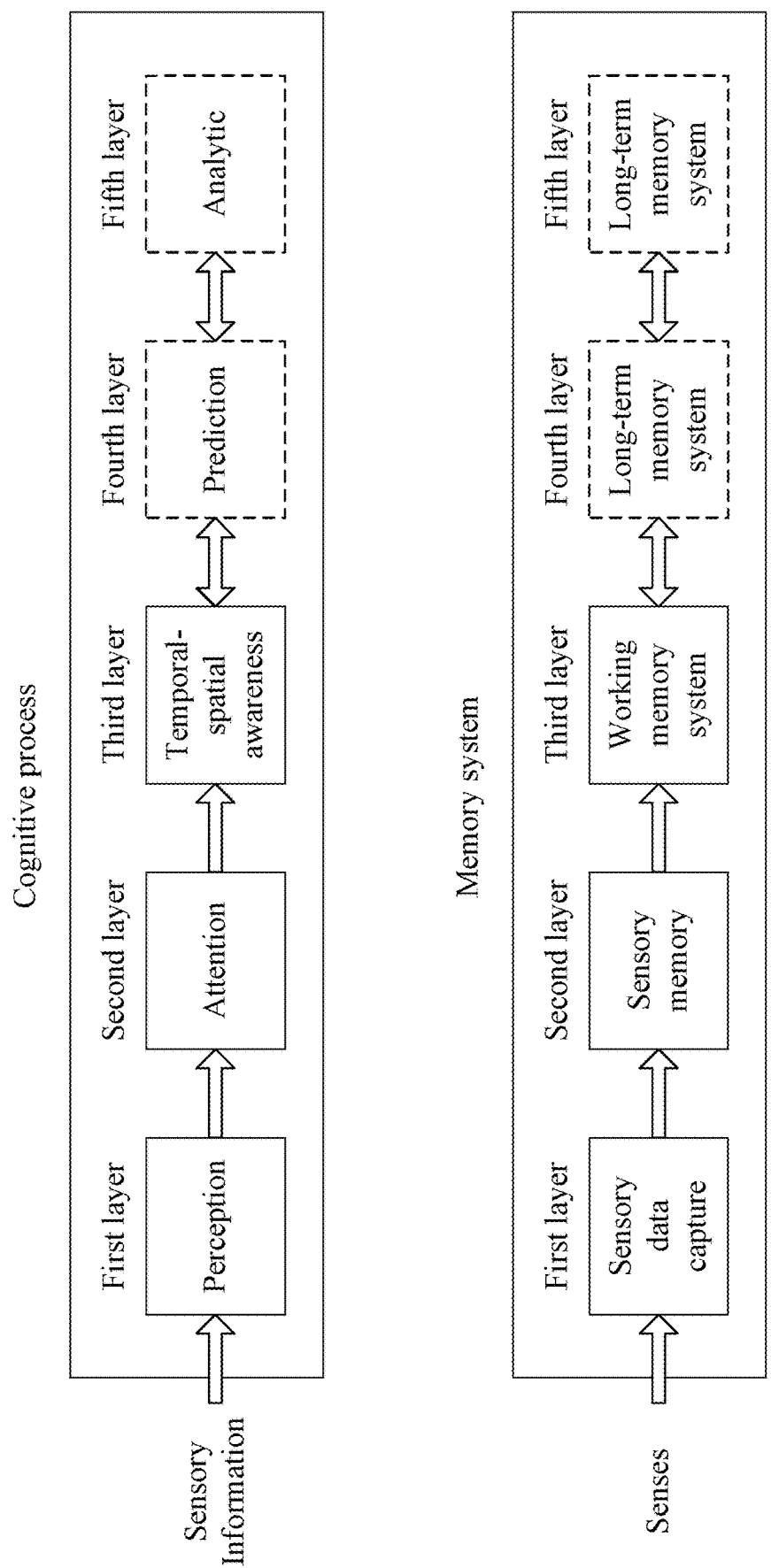
FIG. 2 illustrates the human-like Long-Short-Term Memory (LSTM) framework of the bionic computing system 1.

The bionic computing system 1 is developed based on a human-like Long-Short-Term Memory (LSTM) framework as shown in FIG. 2, where the upper part is the computing processes by analogy with human cognitive processes (i.e., mental processes), and the lower part is the data memory/storage systems by analogy with human memory systems. The framework comprises five layers, and each of which contains a computing process and a memory/storage system. The perception subsystem 11, the attention subsystem 13, the temporal-spatial awareness subsystem 15, the prediction subsystem 17, and the analytic subsystem 19 are respectively responsible for the first layer, the second layer, the third layer, the fourth layer, and the fifth layer. The five layers will be detailed later.

In this embodiment, the bionic computing system 1 adopts an edge cloud architecture. The perception subsystem 11 can be considered as the edge, while the attention subsystem 13, the temporal-spatial awareness subsystem 15, the prediction subsystem 17, and the analytic subsystem 19 can be considered as the cloud. In other embodiments of the present invention, the bionic computing system 1 may adopt other architecture, e.g. integrating the five subsystems as a robot.

Figure 3:
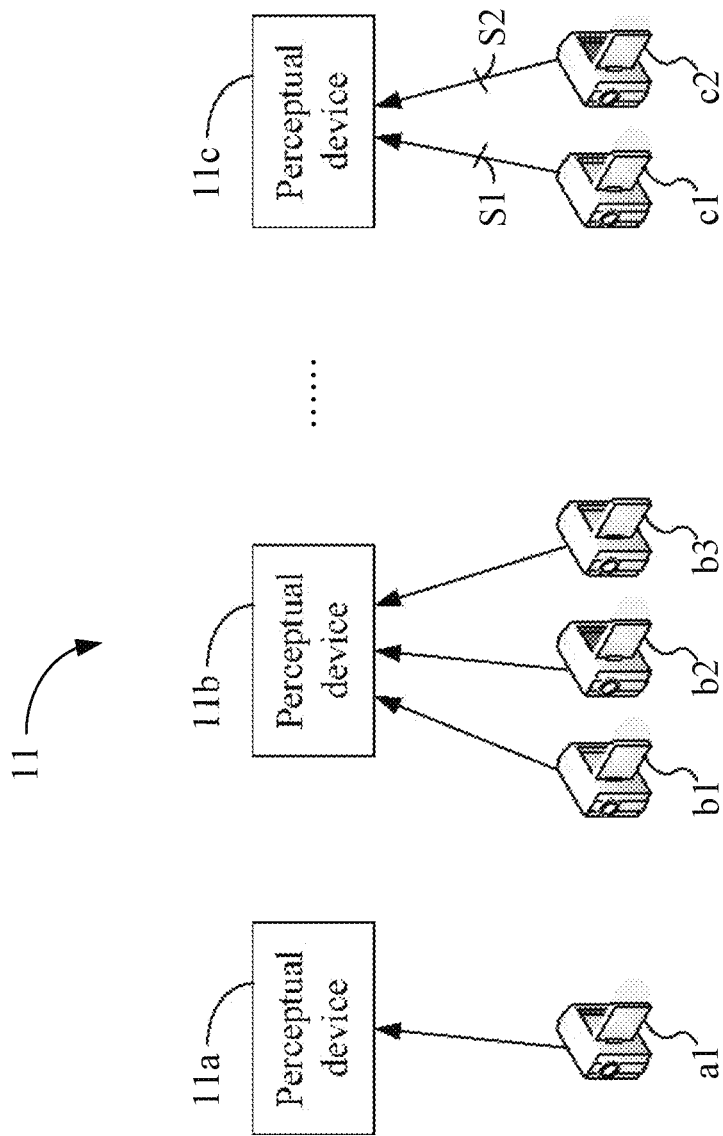
FIG. 3 illustrates an exemplary schematic view of the perception subsystem 11 of the bionic computing system 1.

FIG. 3 illustrates an exemplary schematic view of the perception subsystem 11 of this embodiment. The perception subsystem 11 comprises a plurality of perceptual devices 11a, 11b, . . . , 11c, and each of the perceptual devices 11a, 11b, . . . , 11c corresponds to at least one sensory device. Each of the sensory devices is a device that can generate a sequence of sensory data, such as a closed-circuit television (CCTV) that can generate a sequence of images and a microphone that can generate a sequence of audio clips. In the example shown in FIG. 3, the perceptual device 11a corresponds to one sensory device a1, the perceptual device 11b corresponds to three sensory devices b1, b2, b3, and the perceptual device 11c corresponds to two sensory devices c1, c2.

Figure 4:
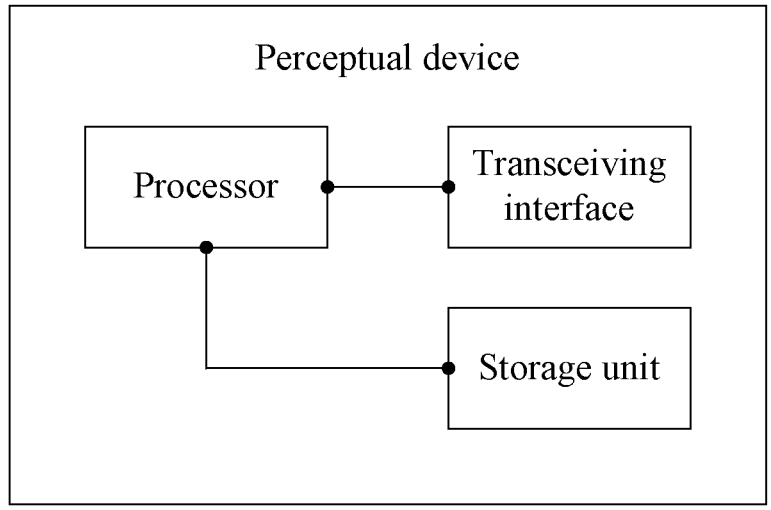
FIG. 4 illustrates a schematic view of any of the perceptual devices 11a, 11b, . . . , 11c.

As shown in FIG. 4, each of the perceptual devices 11a, 11b, . . . , 11c comprises a storage unit, at least one transceiving interface (although only one transceiving interface is shown in FIG. 4), and a processor electrically connected to the storage unit and the at least one transceiving interface. Each processor may be one of various processors, Central Processing Units (CPUs), microprocessors, Digital Signal Processors (DSPs), or any other computing apparatuses having the same functions and well-known to a person having ordinary skill in the art. Each storage unit may be considered as a sensory memory of the bionic computing system 1 and may be realized by any kind of memory (e.g. Random Access Memory (RAM), video RAM), a hard disk drive (HDD) (e.g., a conventional hard disk, a solid hard disk), a universal serial bus (USB) disk, or any other non-transitory storage media or apparatuses with the same function and well-known to a person having ordinary skill in the art. Each transceiving interface may be any interface capable of communicating with one or more apparatuses in a network, e.g., a Bluetooth interface and a Wi-Fi interface. Please note that a perceptual device may use the same transceiving interface to communicate with the corresponding sensory device(s) and the attention subsystem 13. Alternatively, a perceptual device may use one transceiving interface to communicate with the corresponding sensory device(s) and use another transceiving interface to communicate with the attention subsystem 13.

The attention subsystem 13, the temporal-spatial awareness subsystem 15, the prediction subsystem 17, and the analytic subsystem 19 may be realized by a cloud system having one or more servers. That is, each of the attention subsystem 13, the temporal-spatial awareness subsystem 15, the prediction subsystem 17, and the analytic subsystem 19 may be a server individually. It is also feasible that some of or all of the attention subsystem 13, the temporal-spatial awareness subsystem 15, the prediction subsystem 17, and the analytic subsystem 19 are integrated as one server.

Figure 5:
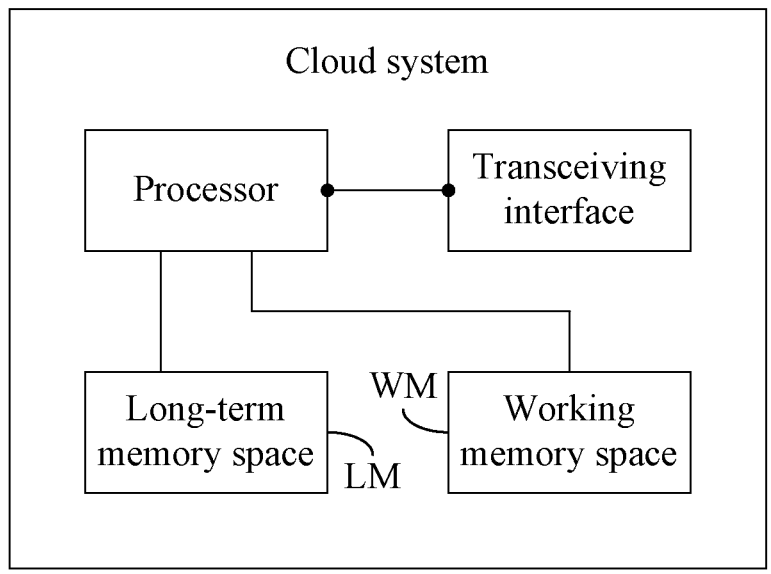
FIG. 5 illustrates a schematic view of a cloud system that can serve as the attention subsystem 13, the temporal-spatial awareness subsystem 15, the prediction subsystem 17, and the analytic subsystem 19.

As shown in FIG. 5, the cloud system comprises at least one processor (although only one processor is shown in FIG. 5), at least one transceiving interface (although only one transceiving interface is shown in FIG. 5), a working memory space WM, and a long-term memory space LM. Each processor may be one of various processors, CPUs, microprocessors, DSPs, or any other computing apparatuses having the same functions and well-known to a person having ordinary skill in the art. Each transceiving interface may be any interface capable of communicating with apparatuses in a network. The working memory space WM may be one of a Random-Access Memory (RAM), a non-volatile memory, an HDD, or any other non-transitory storage media or apparatuses with the same function and well-known to a person having ordinary skill in the art. The long-term memory space LM may be an HDD or any other non-transitory storage media or apparatuses that can store digital data permanently.

The bionic computing system 1 is a human-like memory system, which takes pieces of meaningless information and makes meaning out of it. The bionic computing system 1 adopts the fives layers of computing processes—perception, attention, awareness, prediction, and analysis to handle the incoming sensory information at two different levels, including the subconscious level and the conscious level. While subconscious level is to perceive and memorize every details of sensory information from reality with no intention in mind and for no purpose, conscious level is the level of processes conducted intentionally to identify predefined meaningful events for some specific purpose. Thus, the bionic computing system 1 is able to answer, without the help of human, the Core Questions of Real Reality (CQRR), including (1) what happened? when and where? (2) who was/were involved in the identified event? (3) where is/are the person/people now? (4) what will happen in the near future?

In the following descriptions, the operations performed by the perception subsystem 11, the attention subsystem 13, the temporal-spatial awareness subsystem 15, the prediction subsystem 17, and the analytic subsystem 19 will be given in details.

The perception subsystem 11 corresponds to the computing process of the first layer (i.e. perception). Perception is the ability to see, hear, or become aware of something through the senses. The first layer is related to human-like perceptual capability, designed for sensory data capture via object detection, segmentation by deep learning systems, information encoding by Internet of Things (IoT) devices, searching by web clawers, etc. This type of data acquisition is called artificial perception, since artificial intelligence in general is used not only for handling sensory patterns, but also for processing other types of data such as real-time ticks from stock exchanges. Artificial perception systems involve absorbing intricate details and subtle nuances in pictures, videos, or sounds into the parameters of the neural network of such system. After the training, it is able to perceive the input data based on patterns in images, faces, objects, movements or sounds fed into the system.

Specifically, the perception subsystem 11 performs data acquisition (e.g. data capture, data perception) and object detection, which can be considered as being relevant to the subconscious level. Each of the sensory devices al, b1, b2, b3, . . . , c1, c2 continuously (e.g. periodically) generates (e.g. captures, perceives) a sensory datum and continuously transmits the sensory datum to the corresponding perceptual device. From the viewpoint of the perceptual devices 11a, 11b, . . . , 11c, each of them receives a sequence of sensory data from each corresponding sensory device. Taking the perceptual device 11c as an example, its transceiving interface receives a sequence of sensory data S1 from the sensory device c1 and receives a sequence of sensory data S2 from the sensory device c2. Such sensory data arises timely, non-stop, and with that the fresher (i.e., more recent) the data, the greater the business value.

Each of the perceptual devices 11a, 11b, . . . , 11c detects a plurality of objects from each corresponding sequence of sensory data in an AI-based manner (i.e. each of the received sequence of sensory data). For example, as the perceptual device 11c receives the sequence of sensory data S1 and the sequence of sensory data S2, it detects a plurality of objects from the sequence of sensory data S1 and detects a plurality of objects from the sequence of sensory data S2. To be more specific, each of the perceptual devices 11a, 11b, . . . , 11c performs, by the processor thereof, object detection every time a sensory datum is received. Please note that the number of objects that can be detected from different sensory data may be different. Please also note that the present invention may adopt various ways to detect object(s) from sensory data such as AI-enabled object detection algorithms. For example, if the sensory datum is an image, the processor may adopt the You Look Only Once (YOLO) algorithm to detect objects. Each of the objects detected from the sensory data corresponds to a thing/article/subject in the real world.

For each of the objects, an object record (not shown) is generated by the corresponding perceptual device (i.e. the perceptual device that detects the object). For each of the objects, the corresponding object record comprises a tracking identity (not shown) of the object, a timestamp (not shown) of the object, and a location (not shown) of the object. Each of the tracking identities is locally unique within the same sensory device. That is, for the objects that are detected from the same sequence of sensory data and correspond to the same thing/article/subject in the real world, their corresponding object records comprise the same tracking identity.

As an object detected by any of the perceptual devices 11a, 11b, . . . , 11c corresponds to a thing/article/subject in the real world, the timestamp of the object reflects the time that the thing/article/subject appears in the real world. For example, the timestamp of an object may be the time that the sensory datum comprising the object is generated. Similarly, as an object corresponds to a thing/article/subject in the real world, the location of the object reflects the place that the thing/article/subject appears in the real world (e.g. the location of the object may be used to calculate the global location coordinate that the thing/article/subject appears in the real world). For example, the location of an object may be the location of the sensory device that generates the sensory datum comprising the object. If the sensory datum is an image, the location of the object may further include the position of the object in the image.

With the aforesaid operations, the perceptual devices 11a, 11b, . . . , 11c turn sensory data into structured data (i.e. object records). Each of the object records is simply a fact description of what happened, and when and where does that happen. It alone might carry partial, insignificant, or even imprecise information due to incomplete coverage of sensory devices and the probabilistic nature of deep learning algorithms. Without piecing together all partial information on hand, it is difficult to have total awareness of the whole truth and understand what actually happened in the field. Furthermore, without understanding how the entities (i.e., what/thing, who/person, when/time, where/location, and which/object) are associated among them, it is extremely difficult to identify meaningful events in today's complex world.

To piece together all partial information on hand and understand how the entities are associated among them, each of the perceptual devices 11a, 11b, . . . , 11c transmits, via the transceiving interface thereof, the corresponding object records to the attention subsystem 13 for further processes. At the attention subsystem 13, its transceiving interface receives the object records from the perceptual devices 11a, 11b, . . . , 11c.

The attention subsystem 13 corresponds to the computing process of the second layer (i.e. attention). Attention is the cognitive process of selectively concentrating on a subset of the available sensory information, while ignoring the others. It is about the allocation of limited cognitive processing resources. The second layer is related to human-like computing process and is designed for handling the object records from the first layer. Herein, the ways that the attention subsystem 13 pieces together all partial information on hand, understands how the entities are associated among them, and grasps the overall meaning behind the observed facts are given in details, which can be considered as being relevant to the subconscious level.

The attention subsystem 13 adjusts the object records by re-identifying the tracking identities across the sensory devices al, b1, b2, b3, . . . , c1, c2. To be more specific, a thing/article/subject in the real world may be captured by different sensory devices in different sequences of sensory data. As a consequence, some objects detected from different sequences of sensory data may correspond to the same thing/article/subject in the real world. Likewise, some object records generated by different perceptual devices may correspond to the same thing/article/subject in the real world. To understand what happened to a thing/article/subject as well as when and where does that happen, tracking identities across the sensory devices al, b1, b2, b3, . . . , c1, c2 should be re-identified (i.e. tracking identities of the objects that are detected by different perceptual devices but correspond to the same thing/article/subject should be unified). The attention subsystem 13 identifies the object records that corresponds to the same thing/article/subject in the real world and unifies the tracking identities comprised in these object records.

To understand how the entities are associated among them, the attention subsystem 13 generates a plurality of object associations (not shown), a plurality of location associations (not shown), and a plurality of motion implications (not shown).

Each of the object associations generated by the attention subsystem 13 is between two objects detected from the same sensory datum. As mentioned, an object corresponds to a thing/article/subject in the real world. If two objects were detected from the same sensory datum, it means that the two corresponding things/articles/subjects are associated in the real-world in terms of time and location. Thus, if the attention subsystem 13 discovers that two objects were detected from the same sensory datum (e.g. based on the timestamps and the locations carried in the object records), the attention subsystem 13 generates an object association therebetween according to one or more geo-spatial relation rules.

Each of the location associations generated by the attention subsystem 13 is between one of the objects and a predefined interested location according to one or more geo-spatial relation rules. Please note that one or more predefined interested locations are designated in advance and known to the attention subsystem 13. As mentioned, an object corresponds to a thing/article/subject in the real world. If an object is close to a predefined interested location, it means that the corresponding thing/article/subject and the predefined interested location are associated in the real-world in terms of time. Hence, if the attention subsystem 13 discovers that an object is close to any of the predefined interested locations (e.g. based on the information carried in the object record), the attention subsystem 13 generates a location association therebetween.

Each of the motion implications generated by the attention subsystem 13 pertains to one of the objects with the same tracking identity and two of the sensory data from the same sensory device. As mentioned, an object corresponds to a thing/article/subject in the real world. If a thing/article/subject is moving in the real world, it is often the case that a sensory device will capture the thing/article/subject more than one time. Hence, if the attention subsystem 13 discovers that an object where appeared in two sensory data from the same sensory device (e.g. based on the information carried in the object records), the attention subsystem 13 generates a motion implication for the object according to one or more predefined rules or formulas.

The temporal-spatial awareness subsystem 15 corresponds to the computing process of the third layer (i.e. temporal-spatial awareness). Awareness is the ability of being conscious of something, while temporal-spatial awareness refers to being conscious of the context or, to be specific, the temporal-spatial context. It is an ability to gather information about its environment at any given time and adapt behaviors accordingly. Similar to mind map, temporal-spatial awareness of the third layer is a context-aware computing, designed for understanding and manipulating the temporal-spatial knowledges such as distances, ranges, occurrences, time periods, etc.

Similar to human brain, the working memory space WM is designated to retain perceptual data over a period of time and, work out the intentions and implications from the partial and probably imprecise information. The object records will be stored in the working memory system WM; specifically, the temporal-spatial awareness subsystem 15 organizes and retains the object records in the working memory space WM according to the timestamps and the locations of the object records. The temporal-spatial awareness subsystem 15 may further organize and retain the object associations, the location associations, and the motion implications will be stored in the working memory space WM. In some embodiments, the temporal-spatial awareness subsystem 15 may further examine the time that each of the object records exists in the working memory space WM. If an object record exists in the working memory space WM longer than a predetermined time length, the temporal-spatial awareness subsystem 15 removes it from the working memory space WM to the long-term memory space LM. These operations can be considered as being relevant to the subconscious level of the temporal-spatial awareness subsystem 15.

In some embodiments, the performance of the bionic computing system 1 can be refined by reidentifying the tracking identities in the object records in a location-based manner, a feature-based manner, or an AI-based manner, and the reidentification can be performed by the attention subsystem 13 and the temporal-spatial awareness subsystem 15.

With subjective comprehension, the temporal-spatial awareness subsystem 15 organizes and retains pieces of fractional information into flows of temporal-spatial object records (i.e. with timestamp and location for each object record) and, moreover, annotated with object associations, location associations, and motion associations. The working memory space WM maintains the temporal-spatial object records as a mind map, where every person or object is anonymously identifiable and trackable at any time within the scope of the map.

As the mind map in the working memory space WM is with full awareness of objective reality, the bionic computing system 1 is capable of answering the CQRR relating to any events (e.g. suddenly arisen events) without the help of human being. The details are given below, which can be considered as being relevant to the conscious level.

Conscious level is the level of processes conducted intentionally to identify predefined meaningful events for some specific purpose. To be more specific, a plurality of basic events (e.g. holding a lighter, lighting a cigarette, tumbling over) have be defined in advance, wherein each of the basic events can be considered as an instant action that happens within a very short time (e.g. 1~2 seconds). The perception subsystem 11 identifies any of the basic events from each sensory datum (e.g. in an AI-based manner). Then, the attention subsystem 13 determines whether a portion of the basic events that are from the same sensory device and within a temporal window conform to a predetermined pattern. If the determination result is positive, it means that the attention subsystem 13 has identified an episodic event, and the episodic event is formed by the aforesaid portion of the basic events.

If the attention subsystem 13 identifies an episodic event, the temporal-spatial awareness subsystem 15 further determines whether there is a complex event according to the detected episodic event and an entire history of the object records retained in the working memory space (e.g. according to a predefined inductive rule that reasons out a meaningful pattern from the multiple sources of episodic events and an entire history of the object records retained in the working memory space WM). If the determination result is positive, it means that a complex event has been is identified by the temporal-spatial awareness subsystem 15.

A specific example is given herein for comprehension. It is assumed that the bionic computing system 1 is developed for a security-critical application and, hence, a plurality of basic events (e.g. holding a lighter, lighting a cigarette, fire) regarding the security issues have been defined in advance. It is assumed that the perception subsystem 11 has identified a basic event of holding a lighter, a basic event of lighting a cigarette, and a basic event of having fire from the same sequence of sensory data S1 (i.e. from the sensory data of the same perceptual device). If the attention subsystem 13 further finds out that the aforesaid three basic events are from the same sensory device, happened within a temporal window, and conform to a predetermined pattern (e.g. holding a lighter, then lighting a cigarette, and then being on fire), the attention subsystem 13 determines that an episodic event (e.g. a fire alarm has gone off or people were running out) has happened. Then, the temporal-spatial awareness subsystem 15 may further determine a complex event (e.g., inductive reasoning based on the facts, a fire alarm and running people from sensory data captured by multiple sensors and CCTVs, a complex event of an accidental fire is determined, rather than a false alarm).

Another specific example is given herein. Now, it is assumed that the bionic computing system 1 is developed for a security-critical application in an amusement park. Likewise, a plurality of basic events (e.g. a person being alone, a person being alone and wearing a mask, an adult with a child) have been defined in advance. It is assumed that the perception subsystem 11 has identified a basic event of a person being alone and wearing a mask and a basic event of the same person with a child). If the attention subsystem 13 further finds out that the aforesaid basic events are from the same sensory device, happened within a temporal window, and conform to a predetermined pattern (e.g. a person being alone and wearing a mask and then the same person with a child), the attention subsystem 13 determines that an episodic event (e.g. a child is with a stranger) has happened. Then, the temporal-spatial awareness subsystem 15 may further determine a complex event (e.g., inductive reasoning based on the facts, a child is with a stranger, from sensory data captured by multiple sensors and CCTVs, a complex event of an abduction).

With the information organized and retained in the working memory space WM, the bionic computing system 1 is capable of answering the CQRR relating to any of the aforesaid identified events.

In some embodiments, the bionic computing system 1 can detect a no-show event. For those embodiments, if the attention subsystem 13 suspects a no-show event from one of the sequences of sensory data, the attention subsystem 13 will expect a concerned object corresponding to the no-show event to occur. The attention subsystem 13 starts a timer after suspecting the no-show event. The attention subsystem 13 confirms the no-show event if no concerned object is detected or the concerned object disappears before the timer expires.

A specific example is given herein for comprehension. It is assumed that the bionic computing system 1 is developed for a security-critical application in an airport. Imagine a traffic busy airport with tens of thousands of passengers daily, surveilled with few hundreds of sensory devices (e.g. CCTVs). The bionic computing system 1 can not only detect unattended baggage but also find out who the person is and where the person is now and later. With the mind map, every passenger is tracked and traced anonymously in a quiet background manner, even nothing interesting is happening. Upon the occurrence of a detection of unattended baggage, the mind map will answer the rest four questions immediately without the help of human staff. The mind map with temporal-spatial awareness is yielding to a novel but practical view of grasping meaningful events in a complex world.

The prediction subsystem 17 corresponds to the computing process of the fourth layer (i.e. prediction). The prediction subsystem 17 is designed for predicting what might happen and detecting something unusual, which can be considered as being relevant to the subconscious level. The long-term memory space LM contains a big temporal-spatial database that holds data events for a long period of time. Prediction is the fast thinking part in human brain, which anticipates something about to happen. Before the fast thinking part can take effects, it needs to learn from the experience and train them into a model using machine learning algorithms.

Particularly, the prediction subsystem 17 trains an anticipation model according to the object records, the object associations, location associations, and the motion implications. The trained models are also stored in the long-term memory space LM for reacting to different scenarios in the future. With the trained anticipation model, the prediction subsystem 17 provides a finite sequence of predicted object records for a concerned object.

The analytic subsystem 19 corresponds to the computing process of the fifth layer (i.e. analytic). The analytic subsystem 19 is designed for reasoning or analysis. Reasoning is the slow thinking part in human brain, which conducts analysis according to a specific problem objective. It supports at least four classes of reasoning and analysis: searching, semantics-based reduction, what-if exploratory analysis, and false positive/false negative detection. Specifically, with reference to all the object records in the long-term memory space LM, the analytic subsystem 19 can assist a human or an expert system to analyze and plan an application in a timely and interactive manner.

According to the above descriptions, the bionic computing system 1 brings to life an artificial mind of awareness, which mirrors people, objects, and things everywhere and anytime in the objective world. By means of perception (which is similar to artificial perception), it acquires, organizes, and retains timely data, aiming to reconstruct the real-world dynamics to identify meaningful events, detect unusual situations, track thousands of moving objects, reason out interesting concepts, and/or anticipate something about to happen for the purpose of maintaining security and social order.

Moreover, the bionic computing system is built to adapt to changing environments. By use of machine learning algorithms, it is capable of learning to develop new models from experiences, which are recollected in the long-term memory of the artificial mind. Once a model starts drifting away from the actual situations, the bionic computing system will rebuild the artificial mind by retraining the new model with the recently perceived data to anticipate the new behaviors in the changing environment.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A bionic computing system, comprising:
a perception subsystem, having a plurality of perceptual devices, wherein each of the perceptual devices corresponds to at least one sensory device, the perception subsystem being configured to receive a sequence of sensory data from each corresponding sensory device, detect a plurality of objects from each corresponding sequence of sensory data in an AI-based manner, and generate an object record for each of the objects, wherein each of the object records comprises a tracking identity that is locally unique, a timestamp, and a location;
an attention subsystem, being configured to adjust the object records by re-identifying the tracking identities across the sensory devices, generate a plurality of object associations, generate a plurality of location associations, and generate a plurality of motion implications, wherein each of the object associations is between two objects detected from the same sensory datum, each of the location associations is between one of the objects and a predefined interested location, and each of the motion implications pertains to one of the objects with the same tracking identity and two of the sensory data from the same sensory device; and
a temporal-spatial awareness subsystem, being configured to organize and retain the object records in a working memory space according to the timestamps and the locations,
wherein the perception subsystem is further configured to identify a plurality of basic events from each sensory datum of the same perceptual device, the attention subsystem is further configured to identify an episodic event by determining that a portion of the basic events from the same sensory device within a temporal window conforms to a predetermined pattern, and the temporal-spatial awareness subsystem is further configured to identify a complex event according to the episodic event and an entire history of the object records retained in the working memory space.

2. The bionic computing system of claim 1, wherein one of the attention subsystem and the temporal-spatial awareness subsystem is configured to re-identify the tracking identities in a location-based manner.

3. The bionic computing system of claim 1, wherein one of the attention subsystem and the temporal-spatial awareness subsystem is configured to re-identify the tracking identities in a feature-based manner.

4. The bionic computing system of claim 1, wherein one of the attention subsystem and the temporal-spatial awareness subsystem is further configured to re-identify the tracking identities in an AI manner.

5. The bionic computing system of claim 1, wherein the attention subsystem is further configured to suspect a no-show event from one of the sequences of sensory data and to expect a concerned object corresponding to the no-show event to occur, whereby the attention subsystem is configured to start a timer after suspecting the no-show event, and confirm the no-show event when the concerned object is not detected or when the concerned object disappears before the timer expires.

6. The bionic computing system of claim 1, further comprising:
a prediction subsystem, being configured to train an anticipation model according to the object records, the object associations, location associations, and the motion implications, and
to provide a finite sequence of predicted object records for a concerned object.

7. The bionic computing system of claim 1, wherein the temporal-spatial awareness subsystem is further configured to remove the object records that exist in the working memory space longer than a predetermined time length from the working memory space to a long-term memory space, and the bionic computing system further comprises:
an analytic subsystem, being configured to assist a human or an expert system to analyze and plan an application in a timely and interactive manner with reference to all the object records in the long-term memory space.

8. The bionic computing system of claim 1, wherein the bionic computing system comprises a robot.

9. A cloud system, being adapted to cooperate with a perception subsystem, the perception subsystem having a plurality of perceptual devices where each of the perceptual devices corresponds to at least one sensory device, whereby each of the perceptual devices is configured to receive a sequence of sensory data from each corresponding sensory device, to detect a plurality of objects from each corresponding sequence of sensory data in an AI-based manner, to generate an object record for each of the objects, wherein each of the object records comprises a tracking identity that is locally unique, a timestamp, and a location, the cloud system comprising:
an attention subsystem, being configured to adjust the object records by re-identifying the tracking identities across the sensory devices, generate a plurality of object associations, generate a plurality of location associations, and generate a plurality of motion implications, wherein each of the object associations is between two objects detected from the same sensory datum, each of the location associations is between one of the objects and a predefined interested location, and each of the motion implications pertains to one of the objects with the same tracking identity and two of the sensory data from the same sensory device; and a temporal-spatial awareness subsystem, being configured to organize and retain the object records in a working memory space according to the timestamps and the locations, wherein the perception subsystem is further configured to identify a plurality of basic events from each sensory datum of the same perceptual device, the attention subsystem is further configured to identify an episodic event by determining that a portion of the basic events from the same sensory device within a temporal window conform to a predetermined pattern, and the temporal-spatial awareness subsystem is further configured to identify a complex event according to the episodic event and an entire history of the object records retained in the working memory space.

10. The cloud system of claim 9, wherein one of the attention subsystem and the temporal-spatial awareness subsystem is configured to re-identify the tracking identities in a location-based manner.

11. The cloud system of claim 9, wherein one of the attention subsystem and the temporal-spatial awareness subsystem is configured to re-identify the tracking identities in a feature-based manner.

12. The cloud system of claim 9, wherein one of the attention subsystem and the temporal-spatial awareness subsystem is further configured to re-identify the tracking identities in an AI manner.

13. The cloud system of claim 9, wherein the attention subsystem is further configured to suspect a no-show event from one of the sequences of sensory data and expect a concerned object corresponding to the no-show event to occur, whereby the attention subsystem is configured to start a timer after suspecting the no-show event, and confirm the no-show event when the concerned object is not detected or when the concerned object disappears before the timer expires.

14. The cloud system of claim 9, further comprising:
a prediction subsystem, being configured to train an anticipation model according to the object records, the object associations, the location associations, and the motion implications, and
to provide a finite sequence of predicted object records for a concerned object.

15. The cloud system of claim 9, wherein the temporal-spatial awareness subsystem is further configured to remove the object records that exist in the working memory space longer than a predetermined time length from the working memory space to a long-term memory space, and the cloud system further comprises:
an analytic subsystem, being configured to assist a human or an expert system to analyze and plan an application in a timely and interactive manner with reference to all the object records in the long-term memory space.

* * * * *